(12) United States Patent
Weisser

(10) Patent No.: US 12,254,150 B2
(45) Date of Patent: Mar. 18, 2025

(54) OPERATOR CONTROL AND/OR DISPLAY DEVICE

(71) Applicant: MARQUARDT GMBH, Rietheim-Weilheim (DE)

(72) Inventor: Dietmar Weisser, Tuttlingen (DE)

(73) Assignee: MARQUARDT GMBH, Rietheim-Weilheim (DE)

( * ) Notice: Subject to any disclaimer, the term of this patent is extended or adjusted under 35 U.S.C. 154(b) by 17 days.

(21) Appl. No.: 17/616,829

(22) PCT Filed: Oct. 23, 2020

(86) PCT No.: PCT/EP2020/079936
§ 371 (c)(1),
(2) Date: Dec. 6, 2021

(87) PCT Pub. No.: WO2021/148158
PCT Pub. Date: Jul. 29, 2021

(65) Prior Publication Data
US 2022/0350437 A1    Nov. 3, 2022

(30) Foreign Application Priority Data
Jan. 20, 2020   (DE) .................... 10 2020 000 278.1

(51) Int. Cl.
G06F 3/041   (2006.01)
G06F 3/044   (2006.01)
G09G 5/10    (2006.01)

(52) U.S. Cl.
CPC .......... *G06F 3/0416* (2013.01); *G06F 3/0412* (2013.01); *G06F 3/0446* (2019.05);
(Continued)

(58) Field of Classification Search
CPC .... G06F 3/0412; G06F 3/0416; G06F 3/0446; G09G 5/10; G09G 2354/00;
(Continued)

(56) References Cited

U.S. PATENT DOCUMENTS

| | | | |
|---|---|---|---|
| 2009/0141224 A1* | 6/2009 | Ito | G06F 3/0412 257/E31.127 |
| 2015/0138162 A1* | 5/2015 | Leigh | G09G 3/006 345/178 |

(Continued)

FOREIGN PATENT DOCUMENTS

| | | |
|---|---|---|
| CN | 108682390 A | 10/2018 |
| DE | 102010064056 A1 | 6/2012 |

(Continued)

OTHER PUBLICATIONS

International Search Report and Written Opinion of the International Searching Authority, issued in PCT/EP2020/079936, mailed Feb. 9, 2021; ISA/EP.

(Continued)

*Primary Examiner* — Ryan A Lubit
(74) *Attorney, Agent, or Firm* — Harness, Dickey & Pierce, P.L.C.

(57) ABSTRACT

A touch screen operator control and/or display device (1), for a motor vehicle has a display element (2). At least one graphics element (3) can be represented on the display element (2) by visible light radiation. A sensor (4) detects the representation of the graphics element (3). The sensor (4) detects in particular, changes in brightness on the display element (2).

1 Claim, 6 Drawing Sheets

(52) U.S. Cl.
CPC ........... *G09G 5/10* (2013.01); *G09G 2354/00* (2013.01); *G09G 2360/145* (2013.01); *G09G 2380/10* (2013.01)

(58) Field of Classification Search
CPC ......... G09G 2360/145; G09G 2380/10; B60K 35/00; B60K 37/06; B60K 2370/1442; B60K 2370/52; B60K 2370/95; G02F 1/13318; G02F 1/13338
See application file for complete search history.

(56) References Cited

U.S. PATENT DOCUMENTS

| | | | | |
|---|---|---|---|---|
| 2016/0154315 | A1* | 6/2016 | Liu | G03F 7/2002 134/115 R |
| 2017/0261255 | A1* | 9/2017 | Saikkonen | G09G 5/10 |
| 2018/0005605 | A1* | 1/2018 | Kolli | G06F 1/1626 |
| 2018/0301071 | A1 | 10/2018 | Zhang et al. | |
| 2020/0317213 | A1 | 10/2020 | Oba et al. | |
| 2021/0013283 | A1* | 1/2021 | Liu | H10K 59/35 |

FOREIGN PATENT DOCUMENTS

| | | |
|---|---|---|
| DE | 102013106105 A1 | 12/2014 |
| DE | 112013005918 T5 | 9/2015 |
| DE | 102015206964 A1 | 10/2015 |
| DE | 102018119158 A1 | 2/2019 |
| WO | WO-2017203970 A1 | 11/2017 |

OTHER PUBLICATIONS

Office Action from counterpart German App. No. 102020000278.1 dated Jul. 10, 2020.

* cited by examiner

OPERATOR CONTROL AND/OR DISPLAY DEVICE

CROSS-REFERENCE TO RELATED APPLICATIONS

This application is a 371 U.S. National Phase of International Application No. PCT/EP2020/079936, filed Oct. 23, 2020, which claims priority to German Patent Application No. 10 2020 000 278.1, filed Jan. 20, 2020. The entire disclosures of the above applications are incorporated herein by reference.

FIELD

The disclosure is based on a touchscreen operator control and/or display device with a display element for a motor vehicle.

BACKGROUND

The touchscreen operator control and/or display device can be used as an LCD (Liquid Crystal Display) component for display and/or for operation in a motor vehicle, in particular, in the field of autonomous driving. For example, the operator control and/or display device can be used in a steering wheel of the motor vehicle.

Such an operator control and/or display device includes a display element. At least one graphics element can be represented on the display element by means of light radiation visible to the user. Here, the correct representation of the graphics element is required to provide the user with the required information and/or to enable the desired operation. In particular, for operation reasons it is necessary for the motor vehicle, and specifically especially for autonomously driving motor vehicles, that the graphics element is displayed on the display element when it is activated.

It is an object of the disclosure to further develop the operator control and/or display device so that the correct display is verifiable on the display element. In particular, a lack of representation of the graphics element on the display element should be identified. Above all, the detection of a defective display element should also be guaranteed.

In the case of a generic operator control and/or display device, this object is achieved by a touchscreen operator control and/or display device, for a motor vehicle. It comprises a display element, at least one graphics element represented on the display element by light radiation; and a sensor detecting the representation of the graphics element. The sensor detecting changes in brightness on the display element.

In the operator control and/or display device according to the disclosure, a sensor detects the representation of the graphics element. In particular, the sensor detects changes in brightness on the display element. It has been found that such changes in brightness form a criterion for the representation of the information on the display element. In this way, an incorrectly working, in particular a defective, display element can be identified in a simple manner. Thus, appropriate precautionary measures can then be taken. In an advantageous manner, the user of the operator control and/or display device is increased in this way. As a result, the ASIL C requirement can be met for motor vehicles. Further configurations of the disclosure are the subject of the dependent claims.

In a further configuration, the graphics element can be the representation of an operating element. It can be acted upon the operating element by an object, in particular, by a human finger so that a signal corresponding to the action can be generated. The signal, in particular, of the switching signal type, can be used to operate and/or trigger a function. The display element can be designed in an ergonomically operable manner, as a capacitive touch surface. Such an operator control and/or display device can be operated in a simple manner by the user despite increased awareness.

The sensor can detect changes in brightness by a change in the electrical resistance on the display element in a functionally reliable yet cost-effective manner.

For this purpose, in a further configuration, the sensor comprises a coating of the display element. The resistance changes as a result of the brightness. As a result, a light-dependent parallel resistance to the sensor capacitor is formed for the capacitive operation of the display element. The parallel resistance is able to be determined, for example, via the discharge curve. The coating can be applied in a simple manner by a further printing process on the capacitive touch sensor already formed on the display element. The choice of material and/or the thickness of the coating should be carried out expediently so that the resistance is large enough in order not to impact the normal measurement of the capacity too strongly and/or to provide a good transmission for the light radiation.

In a further embodiment, the sensor can detect changes in brightness by the photo effect, by the release of electrons upon incidence of light. In particular, for this purpose, the sensor comprises a coating of the display element. The material releases electrical charges by light. The charges released, in the form of the external photoelectric, effect change. The charge of the sensor capacitor formed for operation by the user, in turn, can be used to check the correct functioning of the display element. The coating can, in turn, be applied to the display element in a simple manner by printing.

For a particularly preferred embodiment of the disclosure, the following should be noted.

In the course of the developments for autonomous driving, more and more requirements are being placed on displays that are used in motor vehicles. With the ASIL C requirement for displays, it must be checked whether image content is displayed. To implement this requirement, the disclosure proposes expanding the previous capacitive touchscreen as follows:

It includes a further layer. The resistance changes as a result of the brightness. This results in a light-dependent parallel resistance to the sensor capacitor, which can be determined, for example, via the discharge curve. This layer can be applied to an existing capacitive touch sensor by a further printing process. The choice of material and thickness of the layer is expediently carried out in such a way that the resistance is large enough in order not to impact the normal measurement of the capacity too strongly and to provide a good transmission for the light.

A special material for the sensor electrodes is chosen. The material releases charges by the light. These charges change the charge of the sensor capacitor due to the external photoelectric effect.

According to the disclosure, in particular, brightness detection in a display, via the touch foil, is created that can be used to check the correct function of the display. The advantages achieved by the disclosure are, in particular, that the operator control and/or display device offers increased functional reliability for the user. Above all, the ASIL C requirement is met. Thus, the operator control and/or display device can advantageously be used in critical applications, in particular, in motor vehicles, autonomously driving vehicles, aircraft or the like.

DRAWINGS

The drawings described herein are for illustrative purposes only of selected embodiments and not all possible implementations, and are not intended to limit the scope of the present disclosure.

An exemplary embodiment of the disclosure with various further developments and configurations is shown in the drawings and is described in more detail below.

Figure 2:
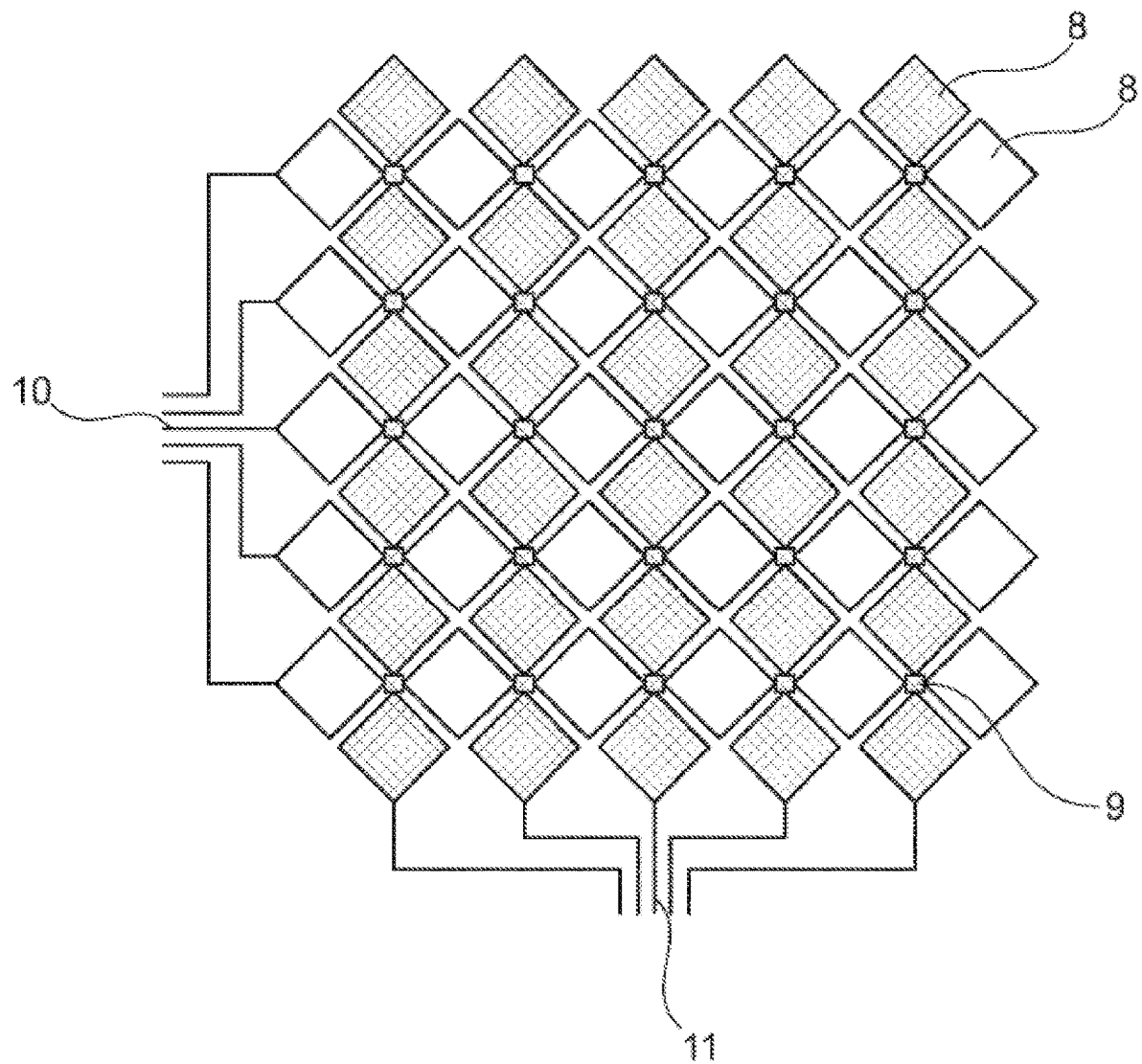
FIG. 2 is a schematic view of a detailed configuration of the display element.
Figure 3:
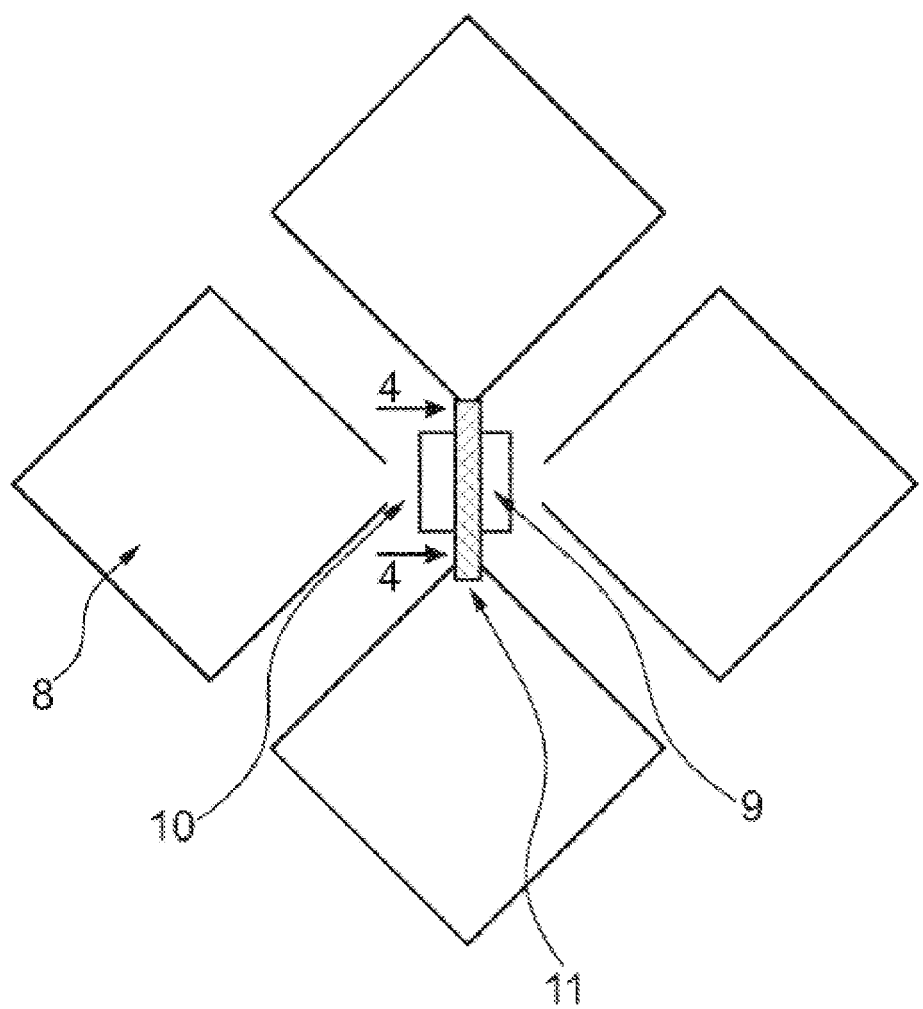
Figure 4:
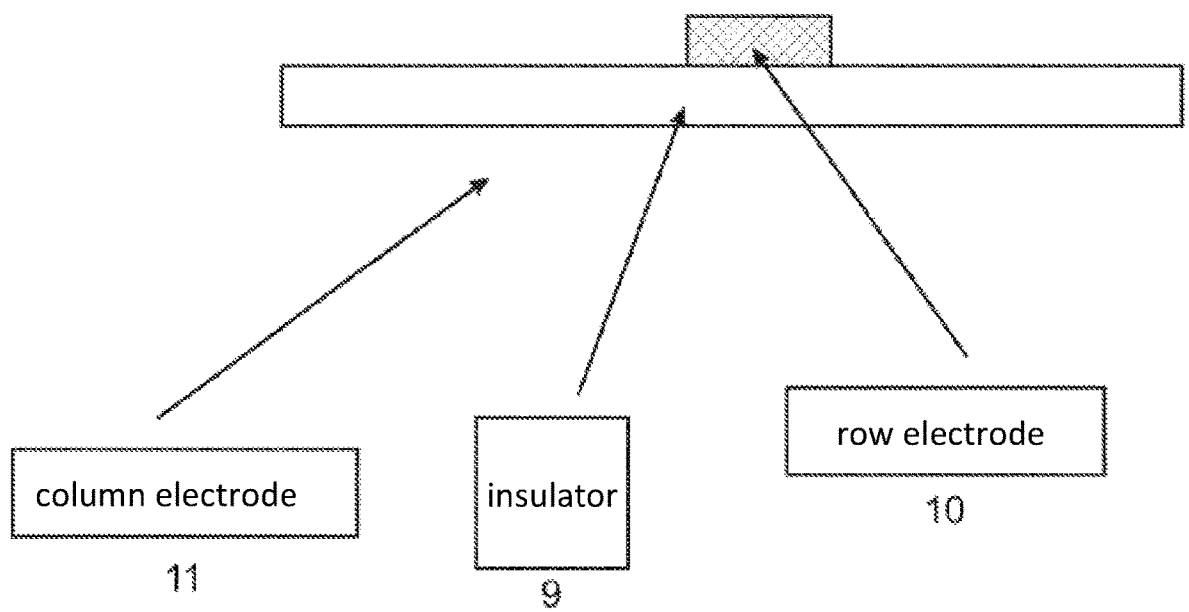
Figure 5:
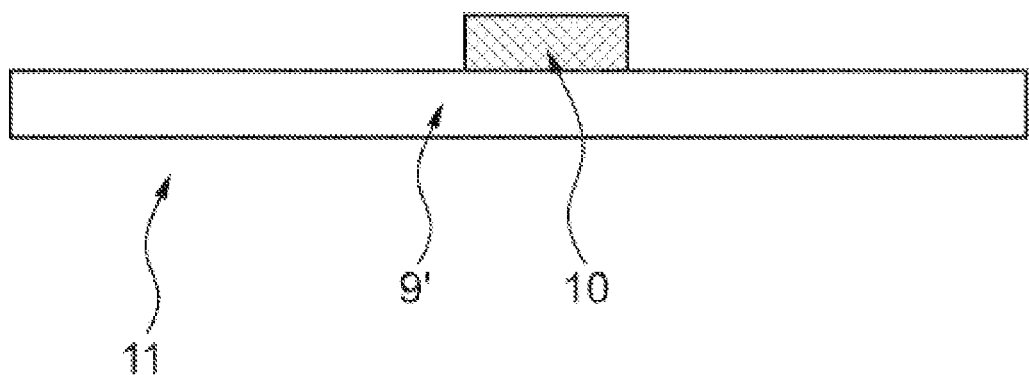
Figure 6:
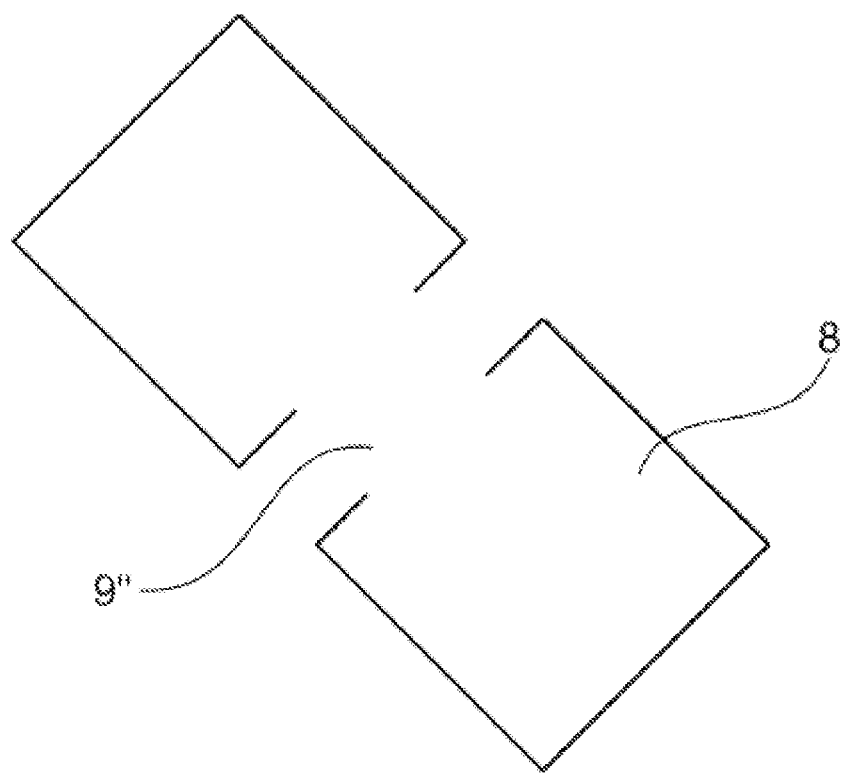

FIG. 3 sis a schematic view of a touch screen enlarged detail from FIG. 2;

FIG. 4 is a schematic view of a touch screen of a section along line 4-4 in FIG. 3 of a conventional touch screen;

FIG. 5 is a schematic view of a touch screen of a section along line 4-4 in FIG. 3 for a touchscreen according to the invention according to a first embodiment, and FIG. 6 is a schematic view of a touch screen of a detail section as in FIG. 3 for a touchscreen according to the invention according to a second embodiment.

DETAILED DESCRIPTION

Figure 1:
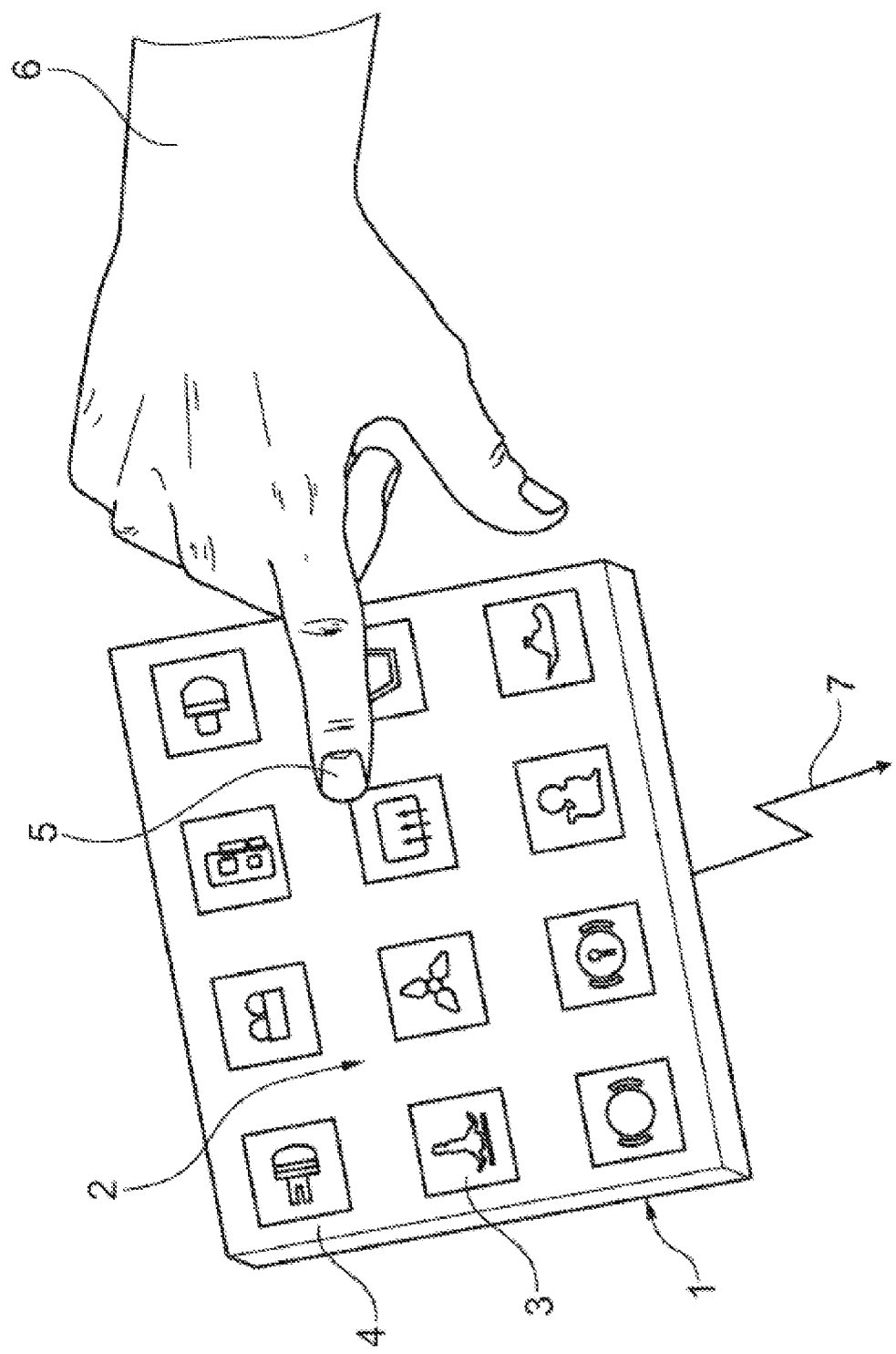
FIG. 1 is a schematic view of a touch screen operator control and/or display device of the touchscreen type with a display element.

FIG. 1 shows a touchscreen operator control and/or display device 1 used, in particular, in a motor vehicle. The operator control and/or display device 1 has a display element 2 designed as a capacitive touch surface. At least one graphics element 3 is represented on display element 2 by light radiation visible to the user. To check the functionality of display element 2, a sensor 4 is downloaded to detect the representation of the graphics element 3. The sensor 4 detects changes in brightness on the display element 2.

The graphics element 3 is the representation of an operating element for operating functions by the user. For example, these functions can be the operation of the air conditioning system, the navigation device, the radio or the like in the motor vehicle. For operation, it can be acted upon operating element element 3 by an object 5, that can be, for example, the finger 5 of a human hand 6. To this end, a signal 7 corresponding to the action can be generated by the operator control and/or display device 1. Signal 7 of the switching signal type, in turn, is used to operate and/or trigger the respective function symbolized by graphics element 3.

For a more detailed structure of the capacitive touch surface on display element 2, turn to FIG. 2. The display element 2 includes, for example, a liquid crystal display (LCD) for displaying graphics element 3. The touch surface on display element 2 includes dot-shaped surfaces 8, arranged in the form of a matrix, made of conductive material transparent to light. For example, the surfaces 8 include printed electrically conductive dots (PDOT) of indium tin oxide (ITO), silver nanowires or the like. The surfaces can be connected to one another in rows and columns in order to provide the capacitive operation for the user. Here, the position of finger 5 is determined via the capacitive ratio of the various surfaces 8 acted upon by finger 5, forming a sensor capacitor. An ohmic connection between the rows and columns of surfaces 8 is normally not desired in this case. As can also be seen from FIGS. 3 and 4, when the display element 2 is implemented by rows and columns with a one-sided structure, insulator layers 9 are arranged between row electrodes 10 and column electrodes 11. The insulator layers 9 electrically connect respective surfaces 8, in order to electrically insulate them.

In a first embodiment, sensor 4 detects changes in brightness caused by the display of graphics element 3 by a change in the electrical resistance on display element 2. Sensor 4 includes a coating of display element 2. The coating resistance of which changes as a result of the brightness. As shown in FIG. 5, for this purpose insulator layer 9 is replaced by a material 9' that changes its electrical conductivity as a function of the brightness. This results in a light-dependent parallel resistance to the sensor capacitor for capacitive operation. This parallel resistance is able to be determined, for example, via the discharge curve.

This layer 9' can be applied to the capacitive touch sensor of display element 2 by a further printing process. The choice of materials and thickness of the coating 9' should expediently be made so that the resistance is large enough in order not to impact the normal measurement of the capacity for the operation by finger 5 as little as possible and/or to provide a good transmission for the light. In a second embodiment, which is shown in more detail in FIG. 6, a material 9" is provided on display element 2 as sensor 4. Upon exposure, the material 9" releases electrical charges in the manner of the external photoelectric effect. Consequently, this generates an electrical voltage that changes the charge of the touch sensor capacitor. Thus, sensor 4, including a corresponding coating 9" of display element 2, detects changes in brightness of display element 2 by the photoelectric effect through the release of electrons upon incidence of light. This light-sensitive layer 9" can be applied between individual surfaces 8 and/or on these surfaces 8 in order to cover a larger area or, in the case of the first embodiment, to use a lower-resistance material 9'. This additional layer 9', 9" is designed as a transparent photo resistor or photo semiconductor and can be applied as a coating on display element 2 by printing.

The disclosure is not limited to the exemplary embodiments described and illustrated. Rather, it also includes all technical further developments within the scope of the disclosure defined by the claims. Thus, the disclosure can be used not only for operator control and/or display devices in motor vehicles but for other uses. The operator control and/or display device according to the disclosure can also be used on other devices, for example for household appliances, machine tools, computer controls or the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A touchscreen operator control and/or display device, for a motor vehicle, comprising:
   a display element;
   at least one graphics element represented on the display element by visible light radiation; and a sensor for checking the functionality of the display element, the sensor is adapted to detect the representation of the graphics element by changes in brightness by a photo effect on the display element so that an incorrectly operating graphics element can be detected;

the sensor is a photo diode comprising a coating applied by printing on the display element, the coating material releases electrical charges by light;

the graphics element is the representation of an operating element, wherein the operating element can be acted upon by an object, in particular by a human finger so that a signal, corresponding to the action, in particular of the switching signal type for operating or triggering a function, can be generated, and that the display element is designed as a capacitive touch foil, and the charges released by the photoelectric effect change the capacitance of the touch foil so that a second value is generated for checking the functionality.

\* \* \* \* \*